United States Patent [19]

Percher

[11] 3,743,936

[45] July 3, 1973

[54] DATA TRANSMISSION SYSTEM ON ONE LINE

[75] Inventor: Guy Percher, Val de Marne, France

[73] Assignee: Schlumberger Instruments Et Systems, Paris, France

[22] Filed: Oct. 20, 1971

[21] Appl. No.: 190,870

Related U.S. Application Data

[63] Continuation-in-part of Ser. No. 32,686, April 28, 1970, Pat. No. 3,699,523.

[30] Foreign Application Priority Data

Oct. 28, 1970 France .............................. 7038826

[52] U.S. Cl. ................................ 325/55, 340/171 R

[51] Int. Cl. ............................................ H04b 7/00

[58] Field of Search ................... 325/22, 53, 54, 55, 325/113; 178/58, 61; 179/2 R, 2 DP, 2 E; 340/147 R, 171 R

[56] References Cited

UNITED STATES PATENTS

| | | | |
|---|---|---|---|
| 3,254,159 | 5/1966 | Condiet | 179/41 R |
| 3,484,694 | 12/1969 | Brothman et al. | 179/2 R |

*Primary Examiner*—Benedict V. Safourek

*Attorney*—William R. Sherman, Jerry M. Presson et al.

[57] ABSTRACT

A data transmission having a central unit and data points grouped in satellite stations. The selection of any data point is performed by: transmitting from the central unit a combination of four frequencies for selecting one of the stations, and then transmitting a combination of three frequencies for selecting one of the data points in that station. Transmission of signals is effected by way of a conductor pair or a radio link, with each station being switched into a transmitting mode when a preselected combination of signals are received thereby.

7 Claims, 5 Drawing Figures

Figure 1:
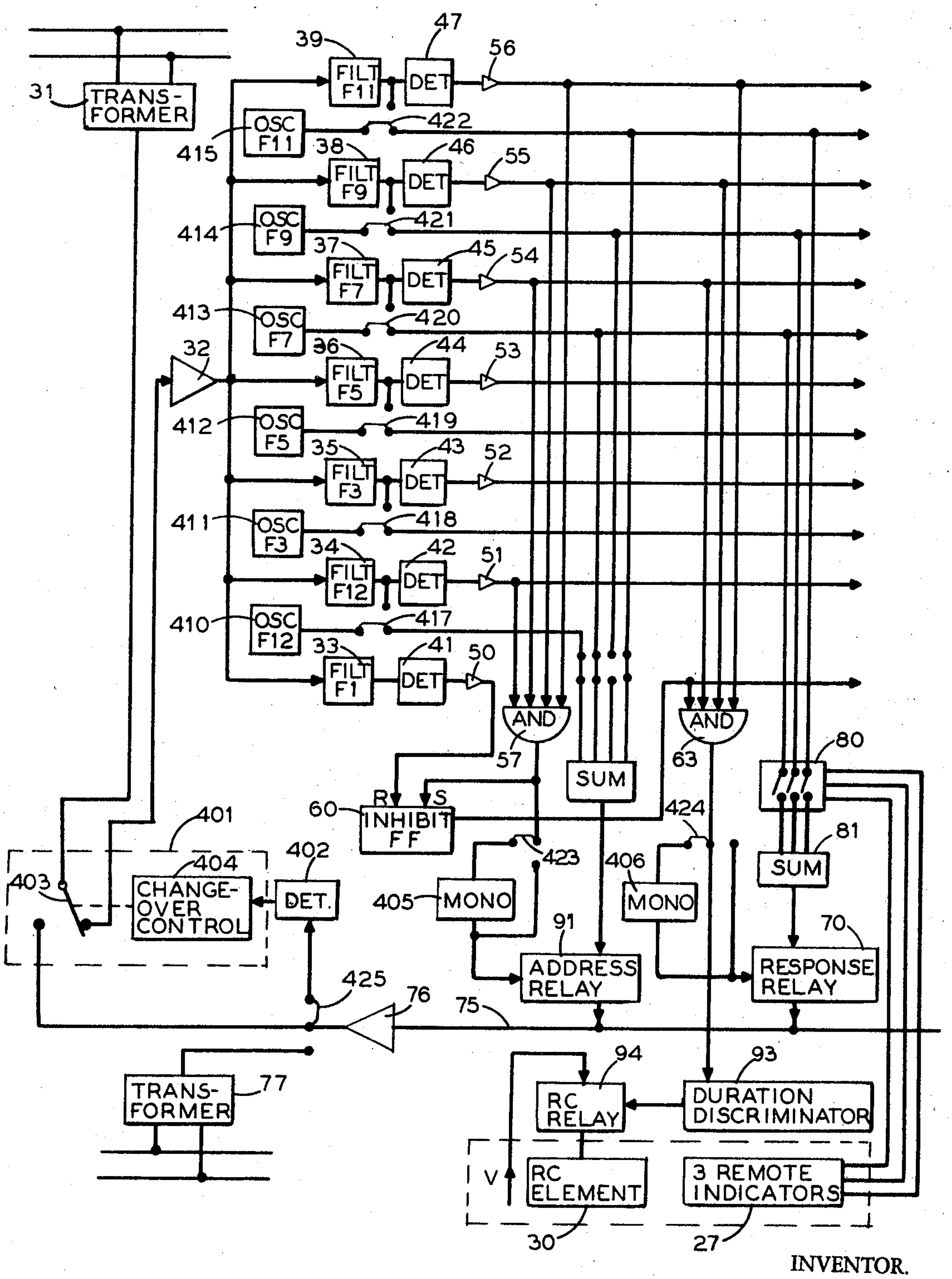

INVENTOR.
Guy Percher
BY
[signature]
ATTORNEY

DATA TRANSMISSION SYSTEM ON ONE LINE

This is a continuation-in-part application of U.S. application Ser. No. 32686, filed Apr. 28, 1970 now U.S. Pat. No. 3,699,523.

The invention relates to a data transmission system permitting the centralization of measurements and controls utilized for the control of an industrial process.

In U.S. Pat. No. 3,699,523 referred to hereinabove, a description is given of a data transmission system comprising a central unit and a plurality of data points, each point being interrogated selectively by the simultaneous transmission of a combination of signals chosen from among a given number N of predetermined frequency channels. The points are grouped in stations, each station comprising *n* filters capable of discriminating *n* given channels from among the said N channels. The interrogation of a given point is carried out in two phases. The first phase involves the prior selection of the station in which the point is located by the transmission of at least $(p+1)$ address signals chosen from among the said *n* channels and the second phase involves the actual selection of the point by the transmission of *p* call signals which are also chosen from among the *n* channels.

In the above-mentioned patent application, there is a description of an embodiment which utilizes, as a transmission medium, a telephone type cable composed of a pair of call conductors and a pair of response conductors. Unfortunately, in certain cases, no telephone line is available or only a two-wire line is available. It is, consequently, of great value to provide a system capable of using as the transmission path either a four-wire line, a two-wire line, or a radio link.

An object of the present invention is to provide a data transmission system of the type described with considerably improved utilization flexibility.

According to one embodiment of the invention, a data transmission system of the above-mentioned type is applicable to a single transmission channel. The central unit operates on a single channel and is switched to the receiving configuration by a main switch after each transmission of call or address signals. Each station, normally connected in the receiving configuration is switched to the transmission configuration by a secondary switch which is triggered by a control signal of predetermined length generated in response to the call or address signals.

In one embodiment, the switch triggering signal is generated by a detector whose input is connected to an output conductor of the station, each data point of the station being connected to the output conductor via a response relay controlled by a monostable circuit triggered by the call signals of the said point.

According to another embodiment of the invention, each station having binary data to be transmitted has at least *p* oscillators which deliver at least *p* different frequency signals thereby making it possible to transmit to the central unit at least *p* simultaneous binary signals.

The transmission medium may be a two-wire telephone line, connected to the transmission subsystem or to the receiving subsystem of the central unit by means of the main switch, and also connected to the input or the output of each station by means of one of the secondary switches.

The transmission medium may also be a radio link in which case the central unit includes a main radio transceiver whose modulation input, low frequency output and transmit-receive control are respectively connected to the transmission subsystem, to the receiving subsystem and to the main switch of the central unit, with each station having a satellite radio transceiver whose modulation input, low frequency output and transmit-receive control are respectively connected to the output, to the input and to the secondary switch of the station.

Figure 2:
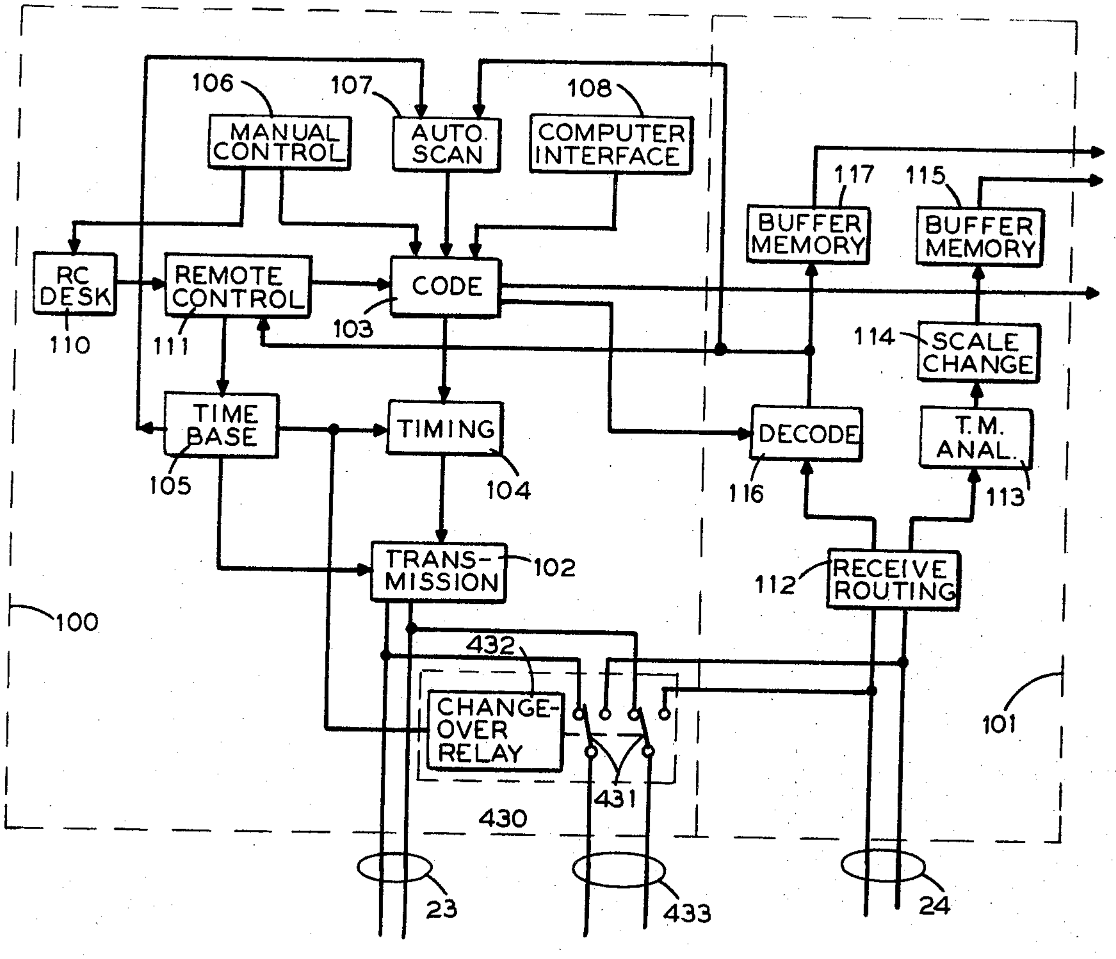
Figure 3:
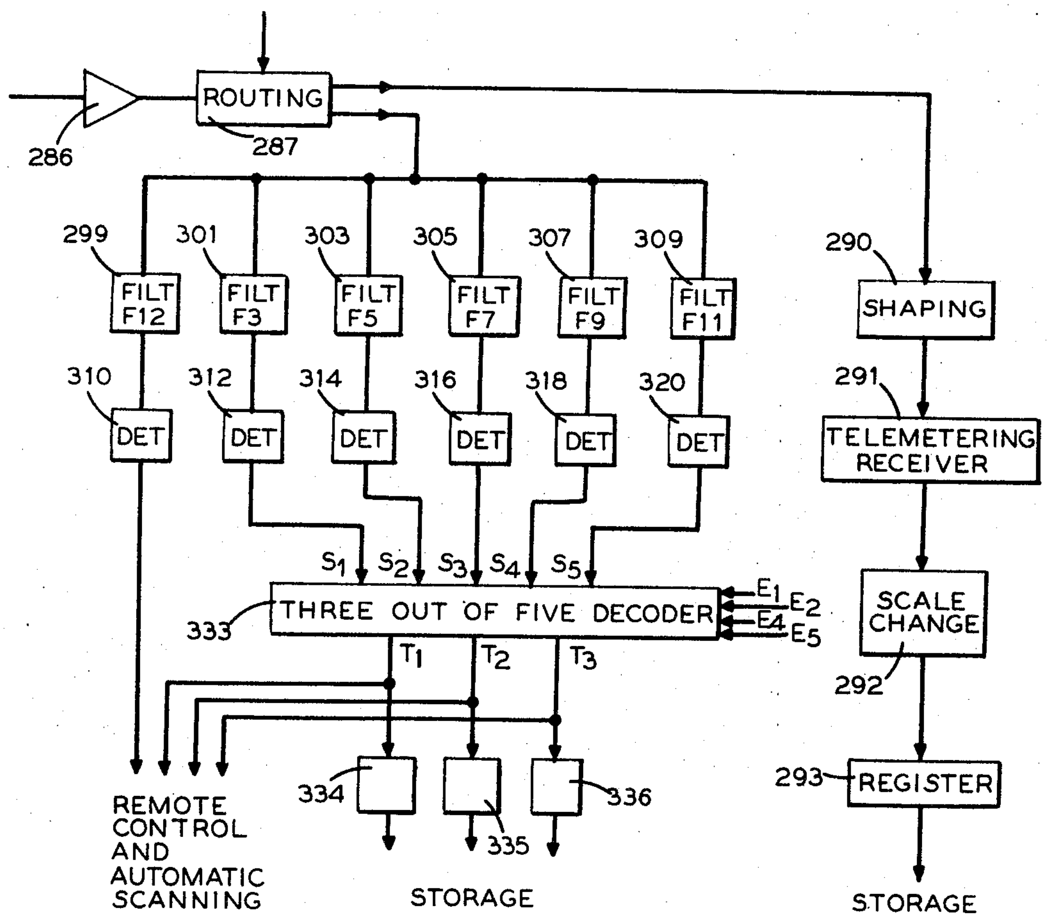
Figure 4:
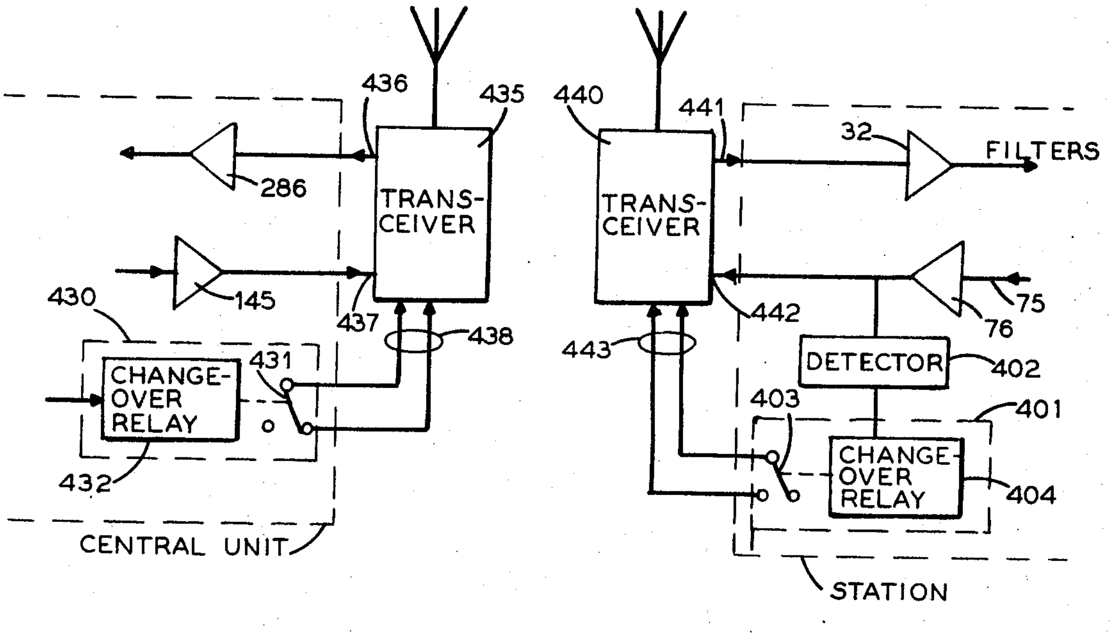
Figure 5:
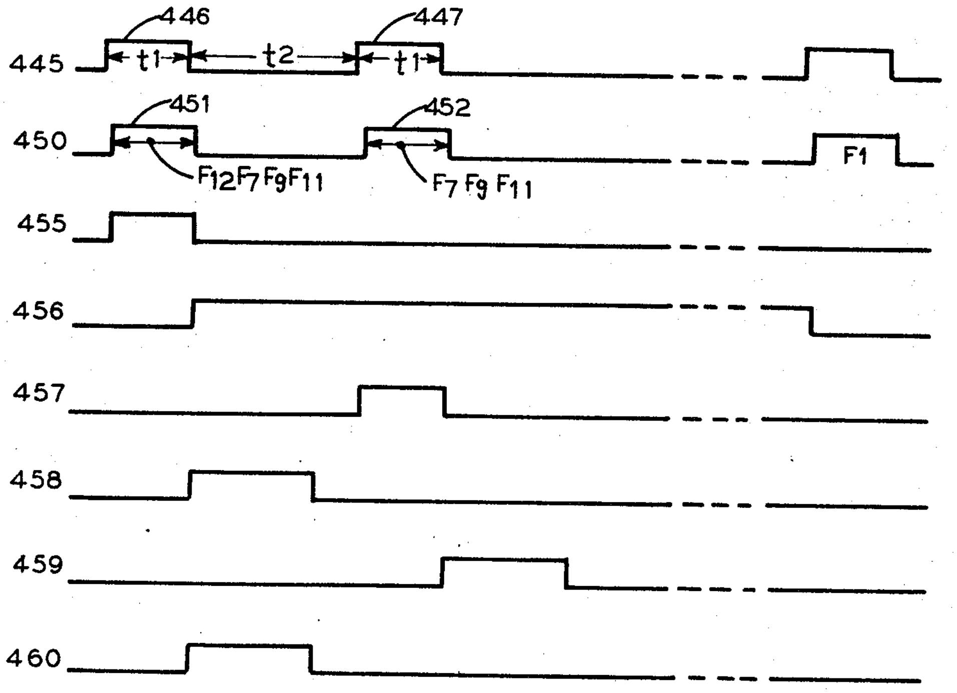

The characteristics and advantages of the invention will be better understood through the description to follow, given by way of example only, with reference to the accompanying drawings wherein:

FIG. 1 is a circuit diagram of a station showing the modifications to be made for transmission on a single two-wire telephone line, FIG. 2 is the circuit diagram of a central unit, designed for transmission on a single two-wire telephone line, FIG. 3 is a more detailed diagram of the decoding circuit of the central unit of FIG. 2, FIG. 4 represents the modifications to be made in the central unit and in each station for transmission by radio link, FIG. 5 is a chronological representation of different signals of the central unit and of one of the stations.

In general, the data transmission system according to the invention consists of a central unit and a plurality of stations substantially identical to those described in U.S. Pat. No. 3,699,523. However, modifications have been introduced to permit transmission either via a two-wire telephone line or by radio link. For simplification, no description will be given of the unmodified parts to which the same reference numbers are assigned and for which one need only refer to the above-mentioned patent.

FIG. 1 represents the diagram of a station connected for transmission over a single two-wire telephone line. Most of the elements of this station are identical to those shown in FIG. 2 of the above-mentioned patent. Such a station comprises a transformer 31 connected to an input amplifier 32 itself connected to the input of seven filters 33 to 39. These filters are connected respectively to seven detectors 41 to 47 themselves connected to amplifiers 50 to 56. The outputs of the amplifiers 51, 54, 55 and 56 are connected to the input of an AND gate 57 whose output is connected to the active state control of an inhibit flip-flop 60. The reset input terminal of the inhibit flip-flop 60 is connected to the output of the amplifier 50. The output of the inhibit flip-flop 60 is connected to the input of an AND gate 63 whose other three inputs are connected to the outputs of the amplifiers 54, 55 and 56.

The AND gate 63 corresponds to a data point which comprises a group of three remote indicators 27 and a remote control element 30. The other data points of the station are not shown in order to simplify the description. The group of three remote indicators 27 controls a set of switches 80 whose output is connected to a summing circuit 81, itself connected to an output conductor 75 via a response relay 70. The remote control element 30 may be actuated by a voltage V applied to this element through a remote control relay 94 connected to the output of a duration discriminator 93 which receives the output signal of the AND gate 63. An address relay 91, connected to the output of a summing circuit 92, makes it possible to apply to the output line 75 a signal representing, in binary-coded form, the number of data points of the station. The station also includes an output amplifier 76 to the input of which is connected the output conductor 75 and an output transformer 77 which is used only for four-wire telephone line transmission. All the elements just described are identical to and have the same function as the corresponding elements in FIG. 2 of the main patent application.

A certain number of elements have been added to permit transmission on a two-wire telephone line. The station first of all includes a change-over relay 401 controlled by a detector 402 connected to the output of the amplifier 76. The change-over relay 401 comprises a change-over switch 403 whose mobile contact is connected to the transformer 31 and whose fixed contacts are connected respectively to the input of the amplifier 32 and to the output of the amplifier 76. The relay 401 also comprises a change-over control 404 connected to the output of the detector 402. The AND gate 57 is connected to the input of the address relay 91 via a monostable circuit 405. The AND gate 63 is connected to the input of the response relay 70 via a monostable circuit 406. Six oscillators 410 to 415 continuously generate signals whose frequencies are, for example, respectively $F_{12}$, $F_3$, $F_5$, $F_7$, $F_9$, and $F_{11}$. The outputs of the oscillators 410, 413, 414 and 415 are connected via switches to the summing circuit 92. The oscillators 413, 414 and 415 are connected to the group of switches 80.

In operation, the station is normally connected in the receiving configuration, i.e. the switch 403 connects the transformer 31 to the input of the amplifier 32. If the four frequencies $F_{12}$, $F_7$, $F_9$ and $F_{11}$ corresponding to the address of the station are transmitted by the central unit, a pulse appears at the output of the AND gate 57. The trailing edge of this pulse triggers the inhibit flip-flop 60 into the active state. This trailing edge also triggers the monostable circuit 405 which closes the address relay 91 for a predetermined period. At the output of the amplifier 76 there thus appears a signal formed by a combination of frequencies correspondig to the coded number of data points of the station. This signal is detected by the detector 402 which changes the position of the switch 403, thereby placing the station in the transmission configuration for a predetermined period. The station thus remains in the transmission position as long as there is a signal on the output line 75, i.e. for the duration of the output pulse of the monostable circuit 405. This duration is chosen so that the station goes back to the receiving configuration before the central unit transmits any new call or address signals.

If the central unit then transmits the combination of signals $F_7$, $F_9$, $F_{11}$ corresponding to the call of the first point of the station, the AND gate 63 enabled by the inhibit flip-flop 60 delivers a signal whose trailing edge triggers the monostable circuit 406. The response relay 70 closes for a predetermined period and if signals from oscillators 413, 414 and 415 are applied over the output conductor 75, depending on the state of the switches 80 controlled by the three remote indicators 27, the detector 402 changes the position of the switch 403 so as to send on the telephone line signals corresponding to the state of the three remote indicators. It will be noted that the connection of the oscillators 410 to 415, that of the monostable circuits 405 and 406 and that of the detector 402 are achieved by means of connection strips 417 to 425 which need only be moved to obtain the circuit shown in FIG. 2. Simply by changing the position of these strips, it is thus possible to change over from two-wire telephone line transmission to four-wire telephone line transmission using the same basic system.

FIG. 2 represents the diagram of a central unit arranged for two-wire telephone line transmission. The elements in this central unit are the same as those shown in FIG. 3 of U.S. Pat. No. 3,699,523. A transmission subsystem 100 comprises a coding module 103 which can receive an address from a manual control 106, an automatic scanning module 107 or a computer via an interface 108. A remote control can also be applied to the coding module through a desk 110 and a remote control module 111. The coding module 103 controls a transmitter 102 via a timing circuit 104 controlled by a time base 105. In a receiving subsystem 101 a routing circuit 112 directs the digital responses to a decoding module 116, and then to a buffer memory 117, and the analog responses to a receiver 113, to a scale-change circuit 114 and to a buffer memory 115.

Moreover, the central unit comprises a main change-over relay 430 composed of a change-over switch 431 and a control 432. The switch 431 connects a single telephone line 433 alternately to the transmission module 102 and to the routing module 112, at intervals taken at the output of the time base 105. The signal applied to the change-over control 432 is the same as the one applied to the timing module 104. By this arrangement, the central unit is switched to the receiving configuration immediately after each transmission of an address or call signal.

Owing to the fact that the same frequencies, i.e. $F_{12}$, $F_3$, $F_5$, $F_7$, $F_9$ and $F_{11}$ are used, irrespective of the station, to transmit data to the central unit, the receiving subsystem and in particular the coding module may be simplified as shown in FIG. 3. This receiving subsystem is unchanged as regards the input amplifier 286, the routing circuit 287 and the analog measuring branch composed of the circuits 290, 291, 292, and 293 (see FIG. 10 of U.S. Pat. No. 3,699,523). On the other hand, the branch used for the digital measurements is highly simplified. The output of the routing circuit 287 is connected only to six filters 299, 301, 303, 305, 307, and 309 tuned on the frequencies $F_{12}$, $F_3$, $F_5$, $F_7$, $F_9$ and $F_{11}$ and connected respectively to the detectors 310, 312, 314, 316, 318 and 320. The outputs of the detectors 312, 314, 316, 318 and 320 are connected directly to the "three-out-of-five decoder" 333. Only the signals $E_1$, $E_2$, $E_4$, and $E_5$ are necessary for decoding. The three outputs $T_1$, $T_2$ and $T_3$ of the decoder 333 are connected to three buffer registers 334, 335 and 336 as in the subsystems described in U.S. Pat. No. 3,699,523. These three outputs and the output of the detector 310 are sent to the remote control and automatic scanning modules. To change over from the normal system to the simplified system, it is possible, for example, to use two interchangeable cards, one having six filters the other 12 filters. It is also possible to use the system including the maximum number of components and to modify the connections by means of movable strips.

FIG. 4 shows the modifications to be made to change over from a two-wire telephone line transmission to a radio link transmission system. Certain elements of the central unit are shown on the left-hand side of the figure. These elements are identical to those shown in FIG. 2. In particular, one will recognize the input amplifier 286 of the receiving subsystem 101, the output amplifier 145 of the transmission subsystem 100 and the relay 430 described earlier with reference to FIG. 2. In the case of a radio link, one adds to the central unit a radio transceiver 435 including a low frequency output 436 connected to the amplifier 286, a modulation input 437 connected to the output of the amplifier 145 and a transmit-receive control 438 connected the the reversing switch 431. As the relay 430 is controlled by timing pulses as described earlier, the transceiver 435 changes over to the receiving position after each signal transmission.

On the right-hand side of FIG. 4 is shown a section of the station of FIG. 1 in which one will recognize the input amplifier 32, the output amplifier 76, the detector 402 and the relay 401 composed of the change-over switch 403 and the control 404. The output of the amplifier 32 and the input of the amplifier 76 are connected as shown in FIG. 1. To this station is added a satellite radio transceiver 440 comprising a low frequency output 441 connected to the input of the amplifier 32, a modulation input 442 connected to the output of the amplifier 76 and a transmit-receive control 443 connected to change-over switch 403. As described earlier, the transceiver 440 changes to the receiving mode when signals are applied to the amplifier 76.

Whether the transmission is carried out by radio link or by two-wire telephone line, the operation of the system is substantially the same. FIG. 5 shows the diagram of the chronological appearance of signals at different points of the system in the case of the automatic scanning of stations and data points. The signals 445 are the timing signals which appear at the input of the relay 430 of the central unit. This central unit is periodically in the transmission configuration for a period of time $t_1$ and in the receiving configuration for a period of time $t_2$ generally longer than $t_1$. By way of example, the first pulse 446 corresponds to the transmission of four address signals for a given station and the pulse 447 corresponds to the transmission of three call signals for a point in this station. When all the points have been called, the pulse 448 corresponds to the transmission of the inhibition frequency $F_1$.

The signals 450 are those which appear at the input of the amplifier 32 of each station. These signals are in fact combinations of one or more frequencies. The first signal 451 for example is a combination of the frequencies $F_{12}$, $F_7$, $F_9$, $F_{11}$, the signal 452 is a combination of the frequencies $F_7$, $F_9$, $F_{11}$ and the last signal 453 uses only the signal $F_1$. These signals are slightly offset in relation to the signals 445 due to the time of transmission. The signal 455 is the output signal of the AND gate 57 in the case of the station shown in FIG. 1. The signal 456 is the output signal of the inhibit flip-flop 60. This flip-flop 60 is in the active state from the appearance of the trailing edge of the output pulse 455 of the AND gate 57 until the appearance of an output pulse from the amplifier 50. The signal 457 is the output signal from the AND gate 63. The AND gate 63, enabled by the signal 456, delivers an output signal when the frequencies $F_7$, $F_9$ and $F_{11}$ represented by the signal 452 are received.

The signals 458 and 459 are respectively the output signals of the monostable circuits 405 and 406. These signals have a predetermined duration and their leading edge coincides respectively with the trailing edge of the signals 455 and 457 appearing at the output of the AND gates 57 and 63. The address relay 91 and the response relay 70 are thus closed throughout the duration of these pulses 458 and 459 respectively, thereby connecting the summing circuits 92 and 81 to the output conductor 75. The signals appearing on the output conductor 75 are detected by the detector 402 and applied to the change-over control 404. The signal 460 is the output signal of the detector 402, assuming that the three remote indicators 27 are in such a condition that the switches 80 are all open, with no signal then appearing on the line 75 throughout the duration of the output pulse 459 of the monostable circuit 406. The transmission period of the station thus corresponds substantially to the duration of the pulses 460. One sees that these pulses are produced during the time intervals in which the central unit is in the receiving configuration. In the case of radio link transmission it will be necessary to also take into account the triggering time of the radio transceiver. The timing of the central unit will then be much slower than in telephone line transmission.

Owing to the modifications just described, a data transmission system is provided in which the transmission medium may be a two-wire telephone line, a four-wire telephone line or a radio link. While maintaining the same system, it is possible to change over from one of these transmission media to the other simply by modifying certain connections, for example by means of movable connecting strips. One thus increases the utilization flexibility of the system without increasing significantly the complexitity of the equipment.

Different variants may be considered for switching a station to the transmission configuration. The change-over switch 403 may be actuated by a pulse of predetermined duration, delivered by a single monostable circuit triggered by the trailing edge of all the output signals of the AND gates of each data point. The switch may also be triggered by the sum of the output signals of the monostable circuits 405, 406, etc. . . . These embodiments make it possible to eliminate the detector 402, but the station is switched over to the transmission position even if one of the points has no signal to send, as for example when the three switches 80 are open, which is a needless waste of energy for the satellite transceivers.

I claim:

1. A system for accessing a plurality of groups of data points, each group of data points being located at different stations, comprising:

a central unit including a transceiver apparatus common to all stations for transmitting and receiving electrical signal frequencies;

filtering means coupled to the signal input of each station for detecting $(n + 2)$ signal frequencies selected from a greater number N of signal frequencies allocated to said central unit, said transceiver apparatus including a transmitter circuit for transmitting to all of said stations combinations of $(p + 1)$ signal frequencies selected from groups of $(n + 2)$ signal frequencies, all the groups having a first common signal frequency, a second common signal frequency common to all the combinations of $(p + 1)$ signal frequencies, and the other $n$ signal frequencies being chosen such that the corresponding groups of $n$ signal frequencies do not have any common combination of $p$ signal frequencies, said transmitter circuit subsequently transmitting at least one combination of $p$ signal frequencies selected from the group of $n$ signal frequencies of the selected station, first selecting means at each station responsive to one predetermined combination of $(p + 1)$ signal frequencies for causing said one station to receive said at least one combination of $p$ signal frequencies so as to select a certain data point in said one station;

said transceiver apparatus also including a receiver circuit for signals transmitted by the selected data point, and a transceiver apparatus at each station for transmitting information to the receiver circuit of the transceiver apparatus of said central unit in response to said at least one combination of $p$ signal frequencies, wherein said central unit is coupled to all the stations by a one-way-at-a-time transmission link, said transceiver apparatus further including switching means for switching said central unit into a receiving mode for a preset time after the transmission of at least one predetermined combination of signal frequencies;

and each station further including switching means for switching the selected station into a transmitting mode for a preset time after the detection of said at least one predetermined combination of signal frequencies.

2. A system according to claim 1 wherein each station further includes at least $p$ oscillators for providing signal frequencies.

3. A system according to claim 2 wherein the frequencies of the oscillators are the same for all the stations.

4. A system according to claim 2 wherein said one-way-at-a-time transmission link is a two-wire transmission line alternately connected to the transmitting circuit and to the receiving circuit of the central unit by operation of the switching means of said central unit, and connected alternately to said filtering means and to said oscillators of each station by operation of the switching means of the station.

5. A system according to claim 2 wherein said one-way-at-a-time transmission link is a single carrier radio link, said central unit further comprising a radio transceiver including a modulation input, a low frequency output and a transmit-receive control connected to the transmitter circuit, the receiver circuit and the switching means of said central unit, respectively;

each station further comprising a radio transceiver apparatus including a modulation input, a low frequency output and a transmit-receive control connected to the oscillators, the filtering means and the switching means of said station, respectively.

6. A system according to claim 2 wherein said switching means in each station includes detector means, means for controlling the application of the signal frequencies provided by the oscillators to said detector means, and means responsive to the output signal of said detector means for applying the signal frequencies provided by the oscillators to the transceiver apparatus.

7. A system according to claim 6 wherein said controlling means includes monostable circuits triggered by the output signals of said first and second selecting means.

* * * * *